United States Patent
Kuji et al.

(10) Patent No.: US 6,786,290 B2
(45) Date of Patent: Sep. 7, 2004

(54) STRADDLE-TYPE FOUR WHEELED ALL TERRAIN VEHICLE

(76) Inventors: Yasuhiro Kuji, 2-32, Kawasaki-cho, Akashi-shi, Hyogo 673-0014 (JP); Yuichi Kawamoto, 104-8, Nishijima, Okubo-cho, Akashi-shi, Hyogo 674-0065 (JP); Takeshi Usui, 1286-60, Amida, Amida-cho, Takasago-shi, Hyogo 676-0824 (JP); Hiroyuki Tezuka, 659-843, Hiraoka-cho, Futamata, Kakogawa-shi, Hyogo 675-0111 (JP)

( * ) Notice: Subject to any disclaimer, the term of this patent is extended or adjusted under 35 U.S.C. 154(b) by 0 days.

(21) Appl. No.: 10/061,669

(22) Filed: Feb. 1, 2002

(65) Prior Publication Data

US 2002/0108795 A1 Aug. 15, 2002

(30) Foreign Application Priority Data

Feb. 2, 2001 (JP) ........................................ 2001-026874

(51) Int. Cl.[7] .............................................. B60K 11/08
(52) U.S. Cl. ...................................... 180/68.1; 180/908
(58) Field of Search ............................... 180/68.1, 68.2, 180/68.3, 68.4, 68.6, 69.2, 69.24, 908, 233, 234; 123/198 E

(56) References Cited

U.S. PATENT DOCUMENTS

| | | | | |
|---|---|---|---|---|
| 4,354,570 A | * | 10/1982 | Tanaka et al. | 180/68.1 |
| 4,496,019 A | * | 1/1985 | Tanaka | 180/68.1 |
| 4,531,928 A | * | 7/1985 | Ikenoya | 180/68.1 |
| 4,597,466 A | * | 7/1986 | Yamada | 180/68.1 |
| 4,606,422 A | * | 8/1986 | Jewett | 180/68.1 |
| 4,697,665 A | * | 10/1987 | Eastman et al. | 180/68.1 |
| 4,712,629 A | * | 12/1987 | Takahashi et al. | 180/68.1 |
| 4,744,432 A | * | 5/1988 | Shibata et al. | 180/68.1 |
| 5,660,243 A | * | 8/1997 | Anzalone et al. | 180/68.1 |
| 6,454,040 B1 | * | 9/2002 | Fukuda | 180/68.1 |
| 2002/0134598 A1 | * | 9/2002 | Nakamura et al. | 180/68.1 |

FOREIGN PATENT DOCUMENTS

| | | |
|---|---|---|
| JP | SHO 64-25978 A1 | 2/1989 |
| JP | 01-301488 A1 | 12/1989 |
| JP | 09-328088 A1 | 12/1997 |
| JP | 2963052 | 8/1999 |
| JP | 2000-313385 A1 | 11/2000 |

* cited by examiner

Primary Examiner—Brian L. Johnson
Assistant Examiner—Jeffrey J. Restifo

(57) ABSTRACT

A straddle-type four wheeled all terrain vehicle includes a bar-type handle provided forward of a straddle-type seat; a vehicle body cover covering a portion of a vehicle body including a steering shaft of the handle, the steering shaft penetrating through the vehicle body cover; and a belt converter, wherein an opening of the vehicle body cover through which the steering shaft pass is an intake port of a cooling air into the belt converter.

7 Claims, 8 Drawing Sheets

STRADDLE-TYPE FOUR WHEELED ALL TERRAIN VEHICLE

BACKGROUND OF THE INVENTION

1. Field of the Invention

The present invention relates to a straddle-type four wheeled all terrain vehicle, and more particularly to an intake structure of a cooling air for a straddle-type four wheeled all terrain vehicle in which a belt converter is mounted to an engine.

2. Description of the Related Art

In the straddle-type four wheeled all terrain vehicle, a belt converter is sometimes mounted to an engine. The belt converter is mounted between a crank shaft of the engine and a transmission to facilitate a speed change operation of a vehicle.

The belt converter is accommodated in a case. Since the belt converter generates heat by an operation thereof, an air is introduced from outside into the case, thereby cooling the belt converter to prevent an increase in temperature in the case.

An example of the intake structure of the cooling air into the belt converter is that a box-shaped space opened at a front and closed at a periphery thereof is provided in a lower portion of a tip end portion of a front fender and an air passage reaching the belt converter is opened in this space (see Japanese Patent No. 2963052).

However, in this structure, when the vehicle is traveling, foreign substances such as trash, mud, water as well as fresh air from front, sometimes enter the intake port. For this reason, there is a need for an improved intake structure of the cooling air into the belt converter.

SUMMARY OF THE INVENTION

The present invention addresses the above-described problem, and an object of the present is to provide a straddle-type four wheeled all terrain vehicle having an intake structure of a cooling air into a belt converter that is capable of preventing the entry of foreign substances such as water and mud with a simple constitution.

According to the present invention, there is provided a straddle-type four wheeled all terrain vehicle comprising: a vehicle body; a straddle-type seat provided on an upper portion of the vehicle body; a bar-type handle having a steering shaft and provided forward of the seat; a vehicle body cover covering a portion of the vehicle body including the steering shaft from above, the steering shaft penetrating through the vehicle body cover; and a belt converter, wherein an opening of the vehicle body cover through which the steering shaft passes is an intake port of a cooling air into the belt converter.

With this constitution, since the intake port through which the cooling air is taken into the belt converter from outside is provided at the middle in the longitudinal direction of the vehicle body and at a high position of the vehicle body, the water, mud or the like hardly enters the intake port. Besides, since the opening of the vehicle body cover through which the steering shaft passes is utilized, the intake port can be structured very simply. Also, the intake port is formed around the steering shaft of the handle and just before the rider, and therefore, if the intake port is clogged with the foreign substances or the like, they can be immediately found and removed.

Preferably, in the straddle-type four wheeled all terrain vehicle, a relay chamber may be formed inside of the vehicle body cover such that the relay chamber communicates with the opening, and a cooling air intake port of the belt converter may be opened in the relay chamber.

Thereby, the cooling air intake passage from the opening of the vehicle body cover to the belt converter can be easily constituted.

Preferably, in the straddle-type four wheeled all terrain vehicle, a portion of the vehicle body cover around the opening may be raised to be formed into a swelled portion, and the relay chamber may be structured to have a chamber wall including one part constituted by a portion of the swelled portion including the opening and the other part through which the steering shaft and a cooling air intake duct having the cooling air inlet port of the belt converter that is opened in the relay chamber penetrate.

Thereby, the intake port through which the cooling air is taken into the belt converter can be formed at a high position because of the swelled portion. In addition, since the swelled portion is utilized as part of the chamber wall, the relay chamber can be easily constituted.

Preferably, in the straddle-type four wheeled all terrain vehicle, a portion of the other part of the chamber wall through which at least the steering shaft and the cooling air intake duct of the belt converter penetrate may be comprised of a flexible plate member.

Since the flexible plate member is flexible, steering shaft, the cooling air intake duct, or the like can be easily made to penetrate through the corresponding through holes even if some positional difference occurs between these members and the through holes.

Preferably, in the straddle-type four wheeled all terrain vehicle, the swelled portion may be configured such that front and side portions around the opening is raised and the swelled portion extends rearwardly, the relay chamber may be structured such that a portion of the swelled portion defines one part of the chamber wall of the relay chamber, a front wall member, a pair of side wall members, a flexible plate member, and a seal structure define the other part of the chamber wall, the front wall member and the pair of side wall members are downwardly protruded at a front end portion and side end portions of the swelled portion that is located forward and side of the opening in an inner face of the vehicle body cover such that the front wall member and the side wall members form an enclosure, the flexible plate member substantially defines a bottom and a rear of a space covered by the portion of the swelled portion that is located forward and side of the opening, the seal structure is formed between a front end of the flexible member and a lower end of the front wall member, and the steering shaft and the cooling air intake duct of the belt converter may penetrate through the flexible plate member.

With this constitution, a wide relay chamber can be formed. Besides, since the bottom wall and the rear wall of the relay chamber can be formed by one flexible member, its structure can be simplified. Further, since the seal structure is provided at the front lower portion of the relay chamber that tends to be splashed with mud or water, the entry of the mud, water, or the like into the relay chamber can be prevented.

Preferably, in the straddle-type four wheeled all terrain vehicle, the seal structure may be formed such that a support member being a frame member of the vehicle body extends along a lower end of the front wall member as having a clearance between the front wall member and the support member, a cushion member may be provided on the support member to fill the clearance, and a front end of the flexible plate member may be connected to the support member.

Thereby, the seal structure can be easily formed.

The above and further objects and features of the invention will be more fully apparent from the following detailed description with accompanying drawings.

DETAILED DESCRIPTION OF THE PREFERRED EMBODIMENTS

Hereinafter, an embodiment of the present invention will be described with reference to drawings.

Figure 1:
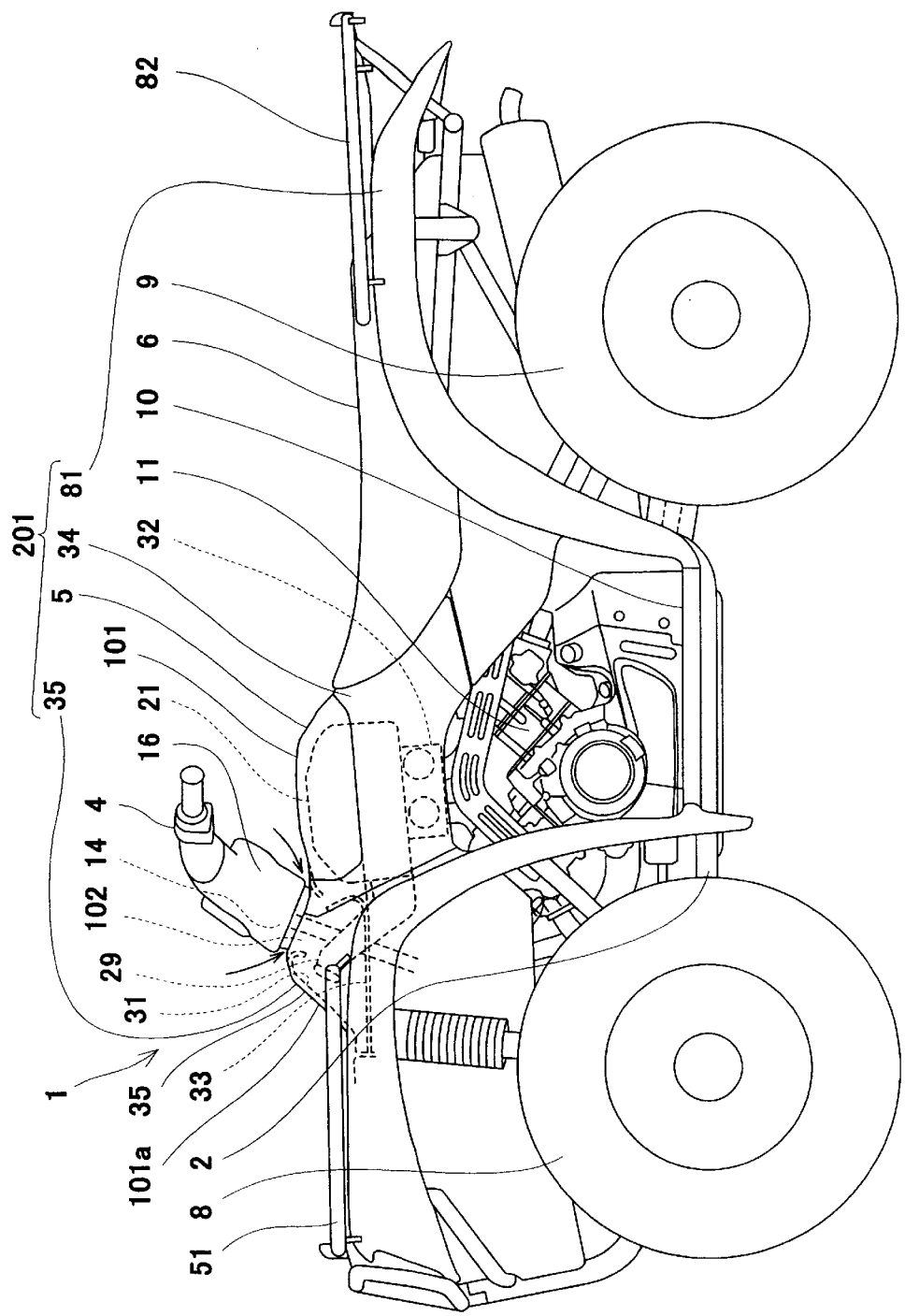
FIG. 1 is a left side view showing an entire configuration of a straddle-type four wheeled all terrain vehicle according to an embodiment of the present invention.
Figure 2:
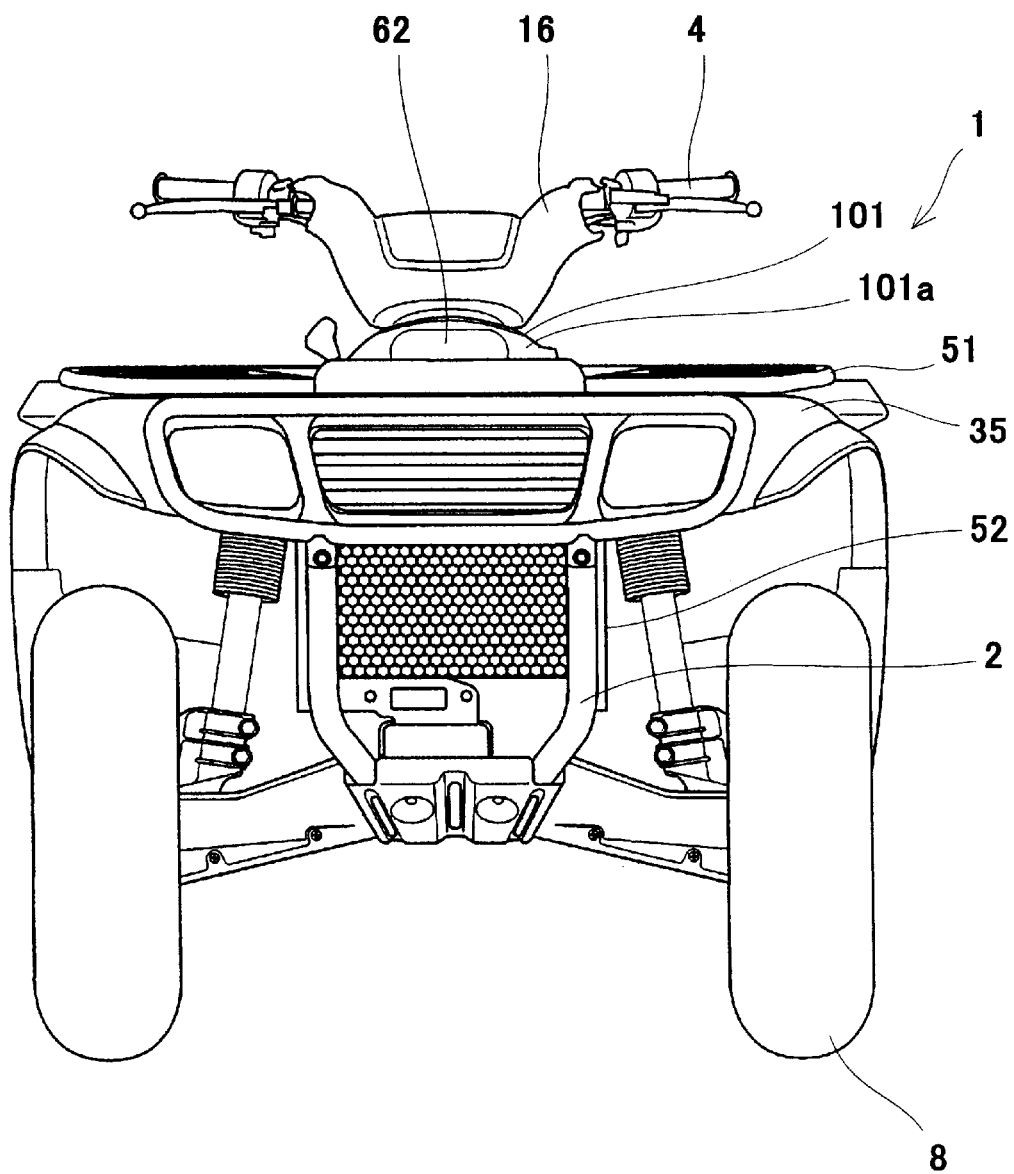
FIG. 2 is a front view showing the entire configuration of the straddle-type four wheeled all terrain vehicle according to the embodiment.
Figure 3:
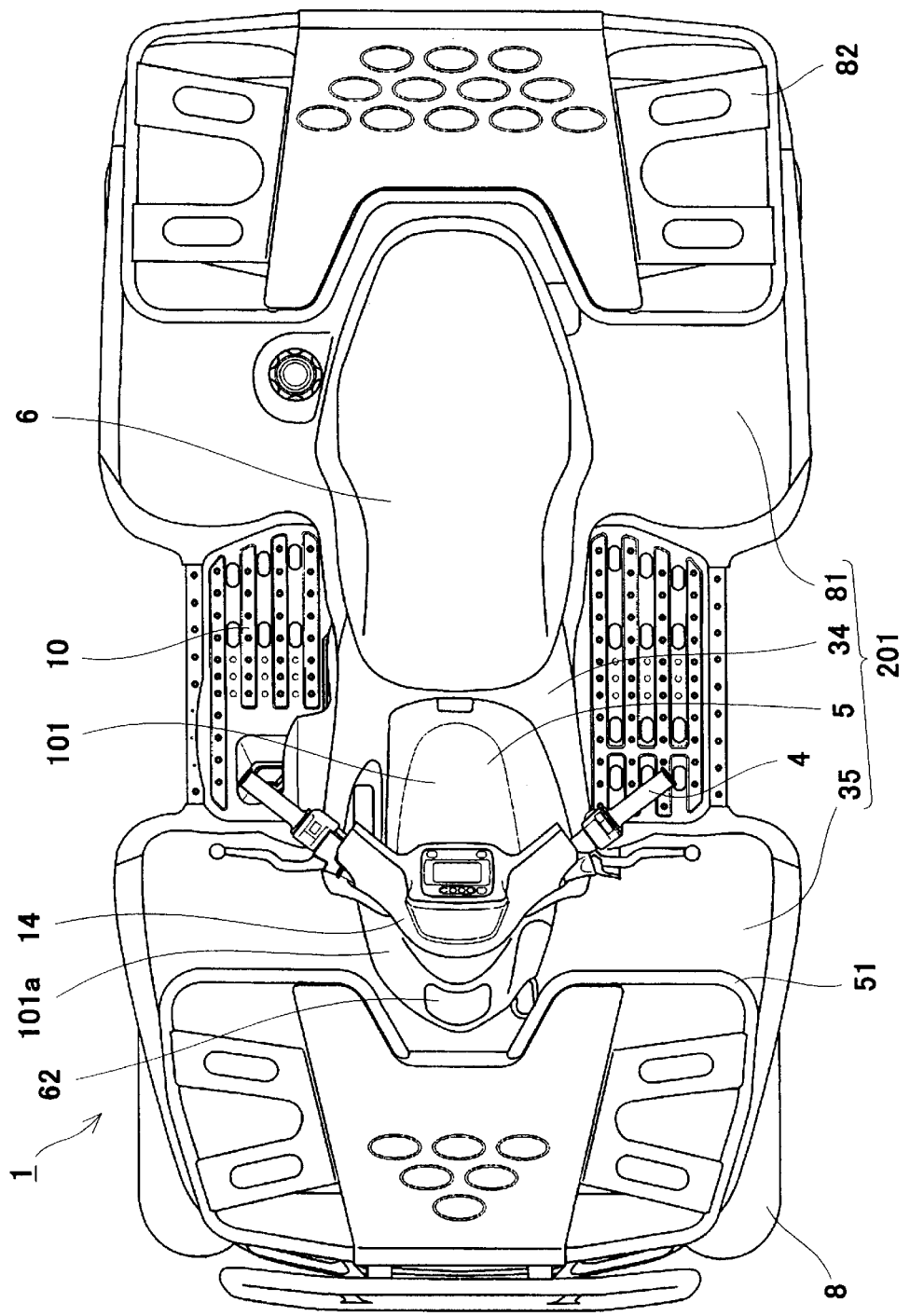
FIG. 3 is a plan view showing the entire configuration of the straddle-type four wheeled all terrain vehicle according to the embodiment.

FIG. 1 is a left side view showing an entire configuration of a straddle-type four wheeled all terrain vehicle according to an embodiment of the present invention, FIG. 2 is a front view thereof, and FIG. 3 is a plan view thereof.

Referring now to FIGS. 1–3, a straddle-type four wheeled all terrain vehicle 1 comprises a steering bar handle 4 mounted to a vehicle body frame (partially shown in figures) 2, right and left front wheels 8, and right and left rear wheels 9. The straddle-type four wheeled all terrain vehicle 1 further comprises a straddle-type seat 6 placed rearward of the handle 4 and apart a certain distance therefrom, and foot boards 10 provided on opposite sides forward and downward of the seat 6, rearward of the handle 4, and at positions substantially as high as an axle of the front wheels 8 and the rear wheels 9. The vehicle 1 is provided with a V-type engine 11 between the right and left foot boards 10 such that a lower end of the engine 11 is substantially as high as the foot boards 10. In the V-type engine 11, two cylinders are respectively inclined forward and rearward. A carburetor 32 is provided between these inclined cylinders for supplying a fuel-air mixture to the respective cylinders. An air cleaner 21 is provided immediately above the carburetors 32 for cleaning an air used in the engine 11. The air cleaner 21 is positioned between the handle 4 and the seat 6. Thus, in this embodiment, a vehicle body structure in which the air cleaner 21 is placed between the handle 4 and the seat 6 is realized by using the V-type engine 11 and by inclining the two cylinders forward and rearward.

A front fender 35 is provided as generally covering a portion of the vehicle body that is located forward of the handle 4 from above. An air cleaner cover 5 and a side cover 34 are provided rearward of the front fender 35 such that these covers generally cover a portion of the vehicle body located between the handle 4 and the seat 6 from above. The air cleaner cover 5 covers a portion of the air cleaner 21 of the portion of the vehicle body located between the handle 4 and the seat 6 from above and the side cover 34 covers the other portion. A rear fender 81 is provided rearward of the side cover 34 such that it generally covers a portion of the vehicle body that is located rearward of the seat 6 other than the seat 6. The front fender 35, the air cleaner cover 5, the side cover 34, and the rear fender 81 compose the vehicle body cover 201. A front carrier 51 is provided on the front fender 35 and a rear carrier 82 is provided on a rear portion of the rear fender 81. An intake opening 102 is formed in a middle portion in the lateral direction of the vehicle body at a boundary portion between the front fender 35 and the side cover 34, for introducing a fresh air into the engine or the like. A steering shaft 14 of the handle 4 passes through the intake opening 102. A handle cover 16 provided on the handle 4 covers the intake opening 102 from above.

The front fender 35 extends substantially horizontally with a width gradually increased from its front end to its rear end. The front fender 35 is configured such that a front half portion of the intake opening 102 is formed in a middle portion of a rear end portion of the front fender 35 and a portion around the front half portion of the intake opening 102 is raised to be formed into a swelled portion 101 and right and left side portions of the rear end portion other than the swelled portion 101 extends downwardly. A front periphery and a side periphery of the front fender 35 are inwardly bent substantially at a right angle. The side cover 34 and the air cleaner cover 5 are entirely curved in the lateral direction of the vehicle body such that their central portions are ridge-shaped. The central ridge portions are substantially horizontal from the front end to the middle portion and downwardly inclined from the middle portion to the rear end in the longitudinal direction of the vehicle body. The air cleaner cover 5 is located on an opening formed at a top portion of the side cover 34. A rear half portion of the intake opening 102 is formed in a middle portion of the front end portion of the side cover 34, which is fitted to a rear end portion of the front fender 35. A rear end portion of the side cover 34 is covered by the front end portion of the seat 6, although this is not shown. In a portion of the vehicle body cover 201 that is comprised of the front fender 35, the air cleaner cover 5, and the side cover 34, front and side portions around the intake opening 102 is raised from the upper surface of the front fender 35 to be formed into the swelled portion 101, which substantially extends rearwardly over a certain length. By thus raising the portion around the intake opening 102, the intake opening 102 can be made correspondingly higher.

A relay chamber 31 is structured such that a portion of the swelled portion 101 that is located forward and side of the intake opening 102 (hereinafter referred to as a swelled front portion) 101a defines one part of a chamber wall thereof and a member such as a flexible plate member 33 defines the other part of the chamber wall. The relay chamber 31 serves to relay the fresh air from the intake opening 102 to the engine or the like. By thus utilizing the swelled front portion 101a as part of the chamber wall of the relay chamber 31, the relay chamber 31 can be easily formed.

A pair of plate-shaped inner covers 52 are provided in a middle portion of an inner space of the front fender 35 such that they extend in the longitudinal direction of the vehicle body over the whole length of the front fender 35 as being apart from each other and having a certain height. The inner covers 52 are inside covers of the front wheels 8 and constitute part of side walls of the relay chamber 31 as mentioned later.

Figure 4:
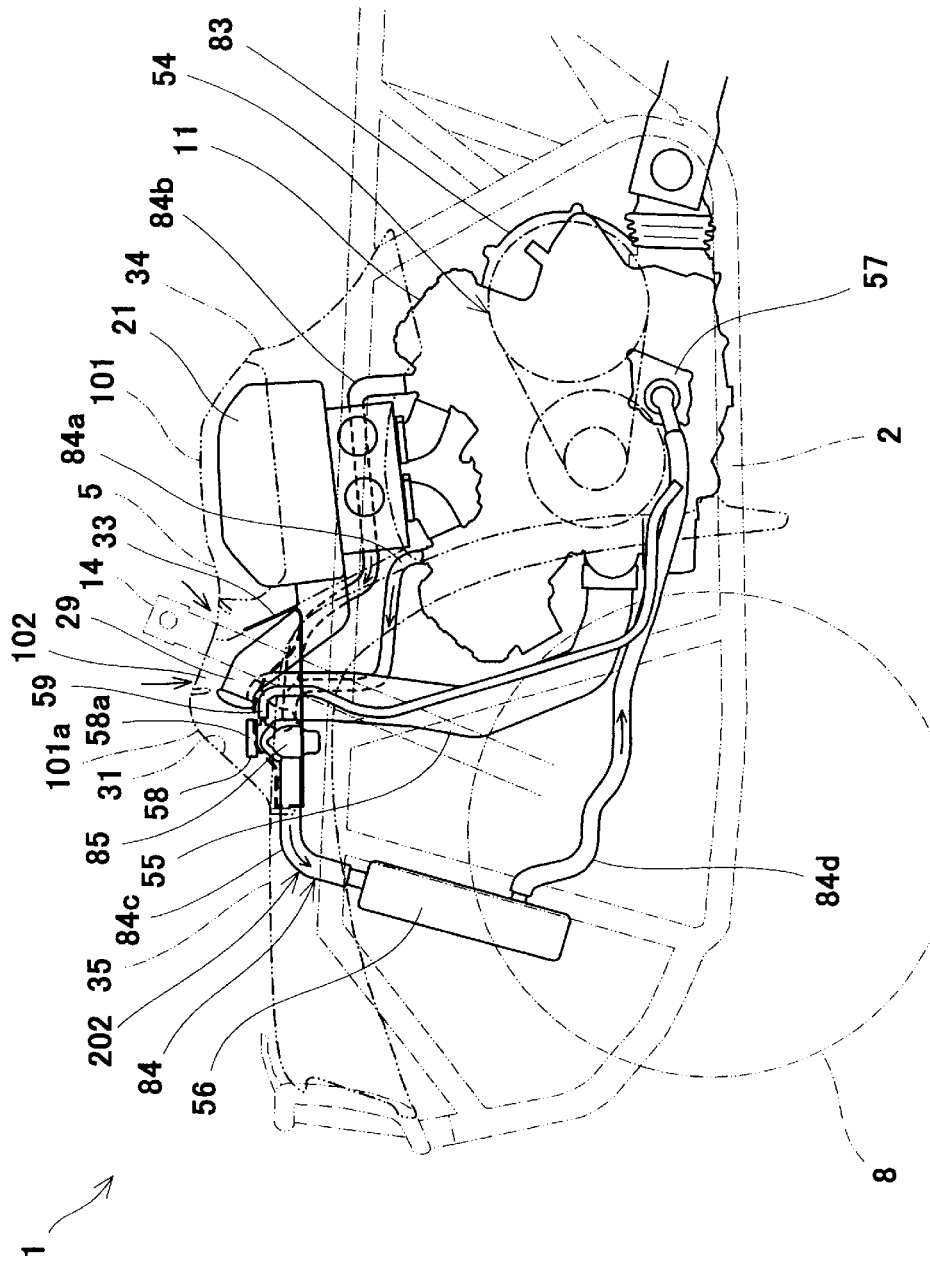
FIG. 4 is a lateral perspective view of a vehicle body main part showing an intake passage of a belt converter and an air cleaner utilizing a relay chamber of FIGS. 1–3 and an engine coolant circulating passage.

FIG. 4 is a lateral perspective view of a vehicle body main part showing the air intake passage of the belt converter and the air cleaner utilizing the relay chamber of FIGS. 1–3 and an engine coolant circulating passage.

Referring to FIG. 4, a belt converter chamber (not shown) is provided on the right side of a crank chamber (not shown) of the engine 11 and covered by a belt converter cover 83. A belt converter 54 is accommodated in the belt converter chamber. A belt converter air intake duct 55 is connected to a front end portion of the belt converter chamber. An exhaust duct (not shown) is connected to the belt converter chamber. The belt converter air intake duct 55 forwardly and upwardly extends from a portion connected to the belt converter chamber and is opened at a tip end thereof in the relay chamber 31. An air cleaner intake duct 29 is connected to a lower portion of a front face of the air cleaner 21. The air cleaner air intake duct 29 extends forwardly and upwardly from a portion connected to the air cleaner 21 and is opened at a tip end thereof in the relay chamber 31. This constitution enables the belt converter 54 and the air cleaner 21 to take in the fresh air through the intake opening 102 provided at the highest position of the vehicle body through the relay chamber 31. In this constitution, since the intake opening 102 of the vehicle body cover 201 through which the steering shaft 14 passes is utilized as the intake port through which the fresh air is taken into the belt converter 54 and the air cleaner 21, the intake port can be simply constituted. Also, since it is not necessary to directly connect the belt converter intake duct 55 and the air cleaner intake duct 29 to the intake opening 102, the fresh air intake passage from the intake opening 102 to the belt converter 54 and the air cleaner 21 can be easily constituted.

A radiator 56 is mounted substantially at the middle of the front end portion of the vehicle body in the vertical direction. A thermostat 85 is provided in the vicinity of a lower portion of the relay chamber 31. A coolant hose 84 connects the radiator 56, the thermostat 85, and the engine 11, thereby forming a circulating passage 202 of the engine coolant (hereinafter simply referred to as a coolant). A water pump 57 is provided on a left side portion of the lower portion of the engine 11. An internal circulating passage (not shown) of the coolant is formed in the engine 11 such that it extends from a discharge port of the water pump 57 to an upper end portion of each cylinder of the engine 11. Two branch hoses 84a, 84b of a discharge-side coolant hose 84c of the water pump 57 (hereinafter referred to as a discharge-side coolant hose) respectively extend forwardly and upwardly from an end of the internal circulating passage of the upper end portion of each cylinder to the thermostat 85, where these hoses meet to be formed into the discharge-side coolant hose 84c, which substantially horizontally extends to a position above and rearward of the radiator 56 and further forwardly and downwardly extends so as to be connected to an upper end of the radiator 56. A suction-side coolant hose 84d rearwardly and downwardly extends from a lower end portion of the radiator 56 and is connected to a suction port of the water pump 57. A coolant filler neck 58 is provided integrally with and adjacently to the thermostat 85 so as to communicate with the thermostat 85, for filling the coolant into the coolant circulating passage 202. The coolant filler neck 58 extends upwardly from the thermostat 58 and is opened at a tip end thereof in the relay chamber 31. A cap 58a is attached to the coolant filler neck 58. Thereby, the filling port of the coolant is positioned at the highest position of the coolant circulating passage 202 without lessening visual appearance. Also, with this constitution, since the discharge-side coolant hose 84c is put through the upper end of the radiator 56 obliquely from above, the air in the coolant circulating passage 202 can be easily released. It should be noted that the coolant filler neck 58 is provided with a coolant overflow pipe 59 mounted vertically downwardly from a side portion of the coolant filler neck 58, for discharging the coolant overflowed from the coolant circulating passage 202.

Figure 5:
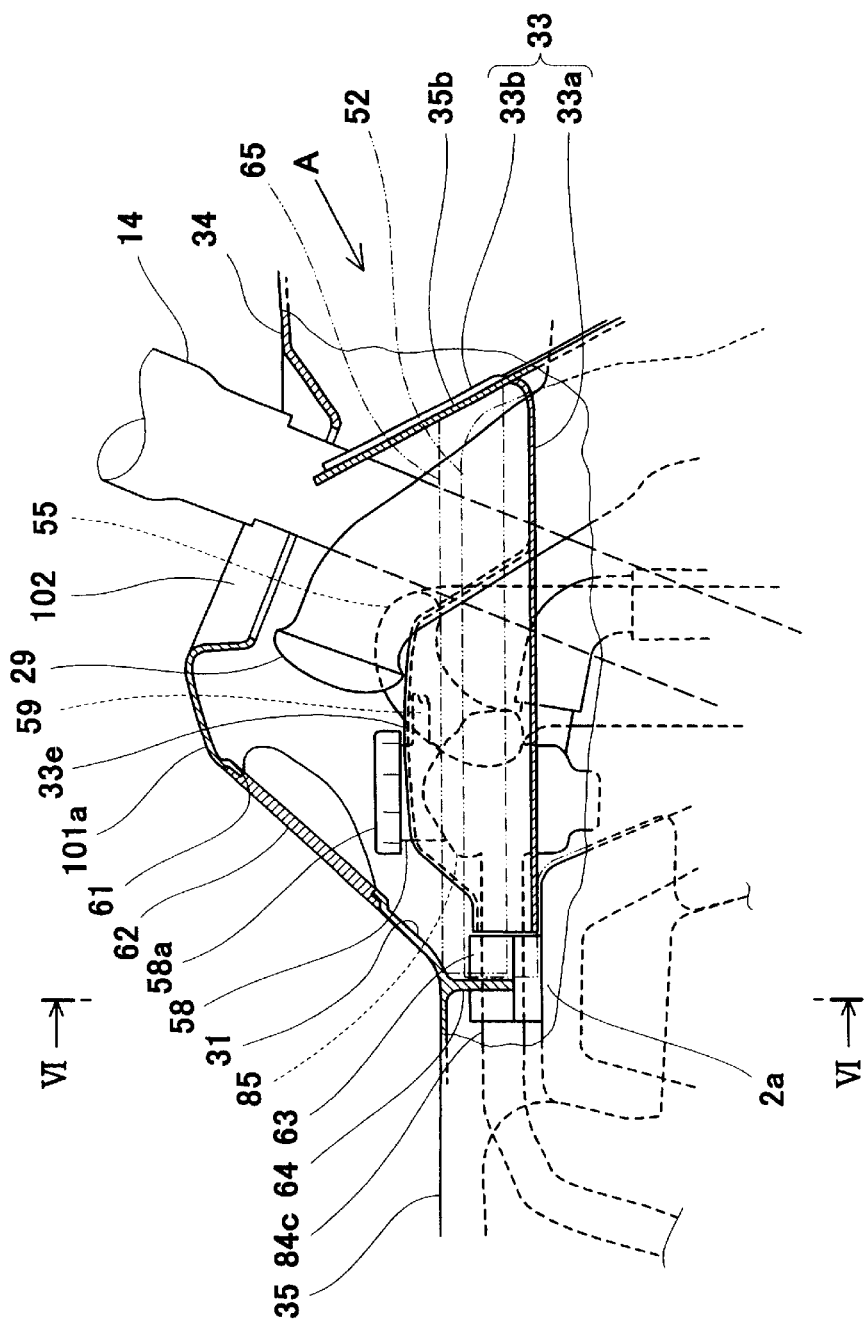
FIG. 5 is a partially enlarged cross-sectional view showing a detailed structure of the relay chamber of FIGS. 1–3.
Figure 6:
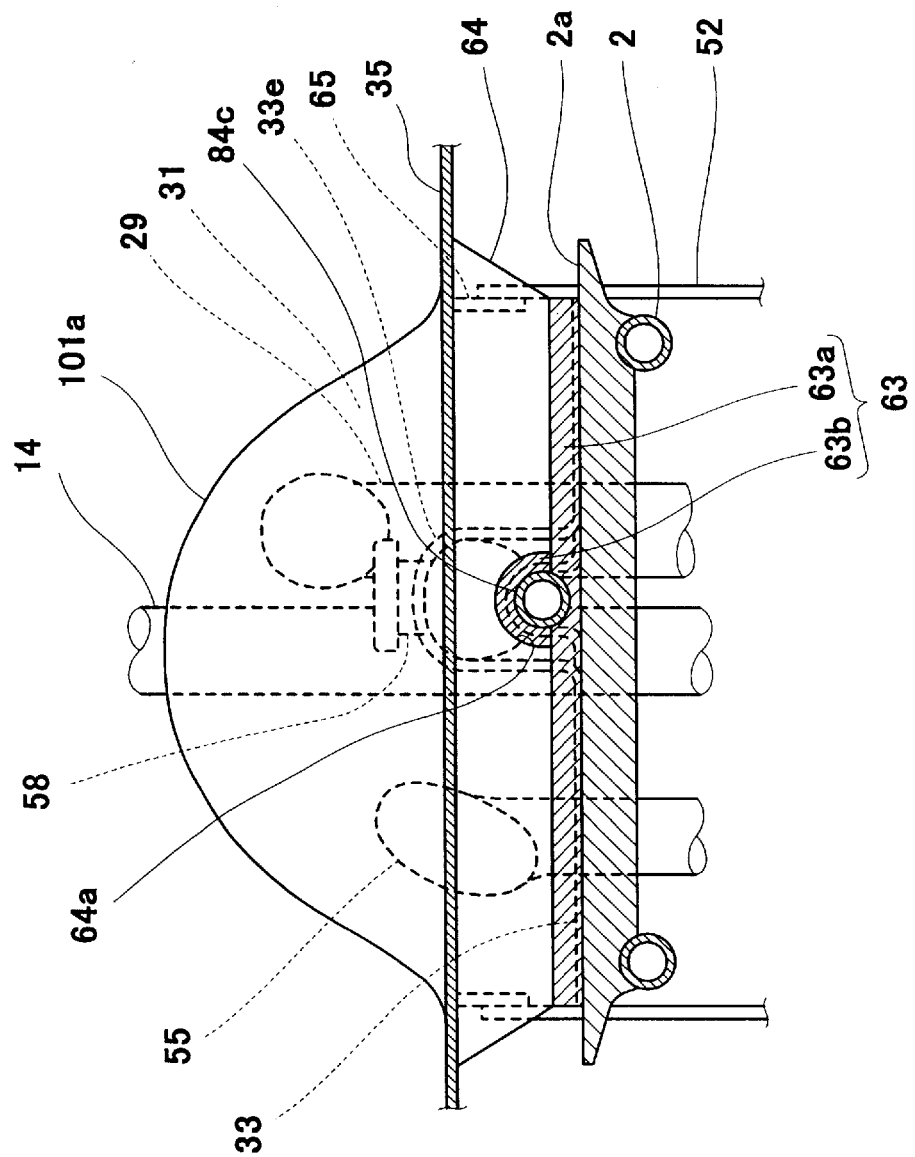
FIG. 6 is a cross-sectional view taken in the direction of the arrow VI—VI of FIG. 5.
Figure 7:
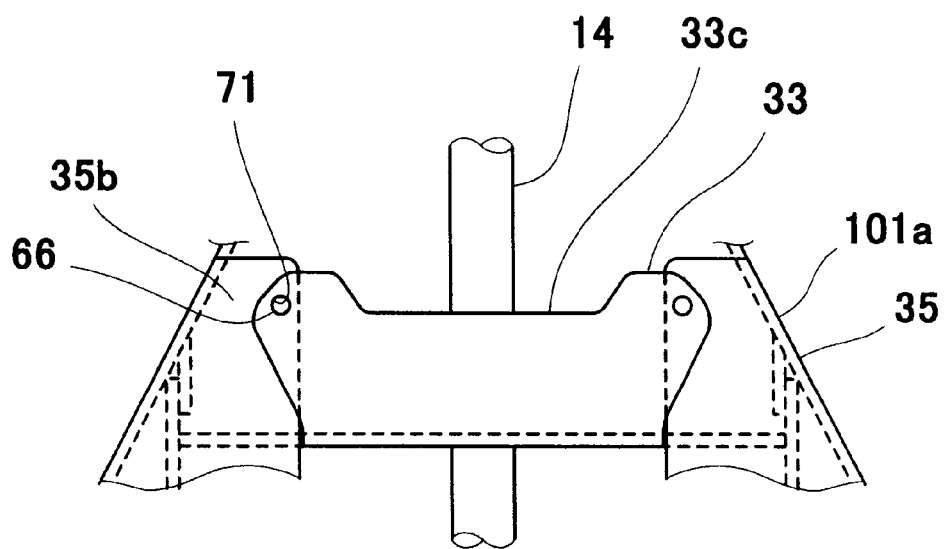
FIG. 7 is a view taken from the direction of the arrow A of FIG. 5.
Figure 8:
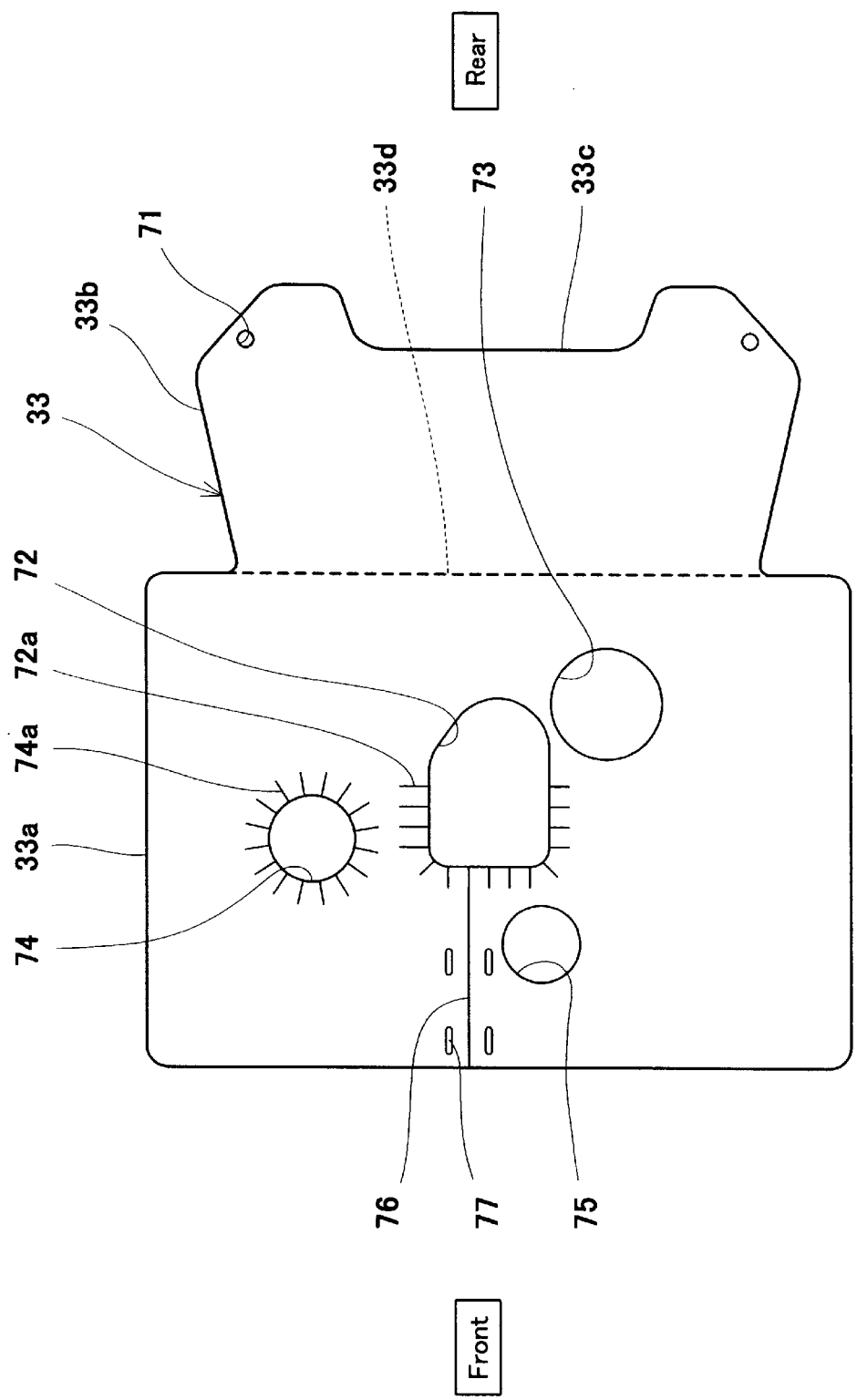
FIG. 8 is a plan view showing a shape of a flexible plate member.

FIG. 5 is a partially enlarged cross-sectional view showing a detailed structure of the relay chamber of FIGS. 1–3. FIG. 6 is a cross-sectional view taken in the direction of the arrows substantially along line VI—VI of FIG. 5. FIG. 7 is a view taken from the direction of the arrow A of FIG. 5. FIG. 8 is a plan view showing a shape of a flexible plate member. In FIG. 5, a side wall portion of the relay chamber 31 is shown as being cut out. In FIG. 5, side wall ribs 65 and the inner covers 52 thus constituting the cut-out side wall portion are indicated by imaginary lines.

As shown in FIGS. 5–7, a plate-shaped front wall rib 64 is provided at a front end portion of the swelled front portion 101a in an inner face of the front fender 35 such that it extends downwardly to a predetermined vertical position and in the lateral direction of the vehicle body over substantially the entire width of the swelled front portion 101a. A semi-circular cut-out portion 64a is formed at a portion located slightly leftward from the center of the lower end of the front wall rib 64. A cross member 2a (support member) extends along the lower end of the front wall rib 64 as having a predetermined clearance below the front wall rib 64. The cross member 2a constitutes part of the vehicle body frame 2 and an upper face thereof is flat. The discharge-side coolant hose 84c penetrates through the front wall rib 64 in the cut-out portion 64a in the longitudinal direction of the vehicle body. A cushion member 63 is provided to fill the clearance between the upper face of the cross member 2a and the front wall rib 64, and the discharge-side coolant hose 84c, and the clearance between the discharge-side coolant hose 84c and the front wall rib 64. The cushion member 63 is, for example, made of sponge and comprised of a portion 63a provided on the cross member 2a and a portion 63b wound around the discharge-side coolant hose 84c.

A pair of side wall ribs 65 are protruded at right and left side end portions of the swelled front portion 101a in the inner face of the front fender 35 such that these ribs extend in the longitudinal direction of the vehicle body. The inner covers 52 are respectively mounted to outer faces of the side wall ribs 65 to extend downwardly.

The side wall ribs 65 and the inner covers 52 cover a side of a space located below the space covered by the swelled front portion 101a over the entire height from the inner face of the front fender 35 to the upper face of the cross member 2a. Therefore, the front wall rib 64, and the side wall ribs 65 and the inner covers 52 form an enclosure at the front end portion and the opposite side end portions of the swelled front portion 101a.

A flexible plate member 33 substantially defines the bottom and rear of the space covered by the swelled front portion 101a, the front wall rib 64, the side wall ribs 65 and the inner covers 52. The flexible plate member 33 is, for example, comprised of a rubber plate. As shown in FIG. 8, the flexible plate member 33 is comprised of a rectangular bottom wall portion 33a and a substantially trapezoid rear wall portion 33b formed at the rear end thereof as having a width smaller than that of the bottom wall portion 33a. The bottom wall portion 33a conforms in shape to the bottom of the space covered by the front wall rib 64, the side wall ribs 65 and the inner covers 52. A steering shaft through hole 72, an intake duct through hole 73 for air cleaner, an intake duct through hole 74 for belt converter, and a coolant filler neck through hole 75 are formed in the bottom wall portion 33a. Cuts 72a and cuts 74a are respectively formed in the steering shaft through hole 72 and the intake duct through hole 74. These cuts make it easy that the corresponding members are inserted into the respective holes. A slit 76 is formed in the bottom wall portion 33a from the front end to the steering shaft through hole 72. The slit 76 allows the steering shaft mounted to the vehicle to be put through the steering shaft through hole 72 when the flexible plate member 33 is mounted to the vehicle body. Elongated holes 77 are formed on opposite sides with respect to the slit 77. The elongated holes 77 are used in such a manner that bands are put therethrough to allow the slit 76 to be tightened to prevent it from being widened after the steering shaft is put through the steering shaft hole 72. A wide cut-out portion 33c is formed at a middle portion of a rear end of the rear wall portion 33b. Small holes 71 are formed on opposite sides of the rear end portion of the rear wall portion 33b.

As shown in FIG. 5, a front end portion of the bottom wall portion 33a of the flexible plate member 33 is placed on the upper face of the cross member 2a adjacently to the rear end of the cushion member 63. The bottom wall portion 33a horizontally extends rearwardly from the portion fixed to the cross member 2a to the rear end of the front fender 35, from where the rear wall potion 33b upwardly and inwardly extends. FIG. 8 illustrates a boundary 33d between the bottom wall portion 33a and the rear wall portion 33b, at which the flexible plate member 33 is bent. As shown in FIG. 7, rear peripheral portions of the front fender 35 are inwardly bent at a right angle to be formed into rear peripheral ribs 35b and resin rivets 66 are formed at predetermined portions of outer faces of the rear peripheral ribs 35b. As shown in FIGS. 5, 7, the rear wall portion 33b of the flexible plate member 33 passes through between the right and left rear peripheral ribs 35b to the outer face side thereof, from where the rear wall portion 33b upwardly and forwardly extends along the outer face of the rear peripheral ribs 35b to a vicinity of the intake opening 102. In the vicinity of the opening 102, the resin rivets 66 are inserted through the small holes 71 and with these rivets, the rear wall portion 33b can be secured to the rear peripheral ribs 35b. The cut-out portion 33c of the rear wall portion 33b serves to prevent interference with the rearwadly inclined steering shaft 14.

As shown in FIGS. 5, 6, 8, in this embodiment, the coolant hoses 84a, 84b, 84c, the thermostat 85, and the coolant overflow pipe 59 are placed in part of the space surrounded by the front wall rib 64 and the side wall ribs 65, and the inner covers 52. The bottom wall portion 33a of the flexible plate member 33 cover these members such that these members are located outside of the relay chamber 31. Therefore, the bottom wall portion 33a is configured to have a swelled portion 33e located at substantially the center in the lateral direction thereof that is slightly leftward when seen in a front view and substantially at a front half thereof when seen in a side view.

The steering shaft 14, the air cleaner intake duct 29, the intake duct 55 for belt converter, and the coolant injecting tube 58 respectively penetrate through the bottom wall portion 33a in the holes 72, 73, 74, 75. By using the flexible plate member 33 as the portions of the chamber wall of the relay chamber 31 through which the members 14, 29, 55, 58 such as the steering shaft or the like penetrates, these members can be easily made to penetrate through the through holes even if some positional difference occurs between the members 14, 29, 55, 58 and the through holes 72, 73, 74, 75.

A coolant supply opening 61 is formed in a portion of the swelled front portion 101a of the front fender 35 that is located above the filler neck 58, and a lid member 62 is removably fitted to the coolant supply port 61 (see FIGS. 2, 3).

Thus, the swelled front portion 101a, the front wall rib 64, the cushion member 63, the cross member 2a, the side wall ribs 65, the inner covers 52, and the flexible plate member 33 constitute the chamber wall of the relay chamber 31. This constitution provides the wide relay chamber 31. Besides, since the bottom wall and the rear wall of the relay camber 31 are constituted by one flexible plate member 33, the structure can be simplified.

Subsequently, how so constituted straddle-type four wheeled all terrain vehicle operates and is used will be explained.

Referring to FIGS. 1–5, when the rider starts the straddle-type four wheeled all terrain vehicle 1 and the engine 11 operates, the belt converter 54 is activated, thereby causing the fresh air to be taken into the belt converter chamber through the clearance between the intake opening 102 and the steering shaft 14, the relay chamber 31, and the belt converter intake duct 55. The belt converter 54 is cooled by the fresh air. Meanwhile, the fresh air to be used in the engine 11 is taken into the air cleaner 21 through the clearance between the intake opening 102 and the steering shaft 14, the relay chamber 31, and the air cleaner intake duct 29 and purified therein to be supplied to the engine 11 through the carburetor 32. While the straddle-type four wheeled all terrain vehicle 1 is traveling, foreign substances such as water or mud sometimes might fly from front of the vehicle. However, since the front portion of the relay chamber 31 is closed and the intake opening 102 as the intake port of the fresh air is provided at the central portion in the longitudinal direction of the vehicle body and at a high position of the vehicle body, the foreign substances such as water or mud hardly enters the intake opening 102. In addition, since the intake opening is formed around the steering shaft 14 of the handle 4 and located just before the rider. Therefore, if the intake opening 102 is clogged with the foreign substances, they can be found immediately and removed. In some cases, the water, mud or the like splashes up from below of the vehicle body. In such cases, the mud or water tends to splash up to the front lower corner portion of the relay chamber 31, but since a seal structure comprised of the cushion member 63 and the cross member 2a is formed in this portion, the entry of the water or mud into the relay chamber 31 can be prevented.

Meanwhile, when the engine 11 starts, the coolant circulates through the circulating passage 202 to cool the engine 11. By opening/closing the control valve of the thermostat 85, the circulation of the coolant is released or stopped. When the temperature of the coolant is increased to a certain value or more and an internal pressure is increased to cause the coolant to be overflowed, the overflowed coolant is discharged from the coolant overflow pipe 59 to a reserve tank (not shown). When the coolant is changed or the amount of the coolant is checked, the rider opens the lid member 62 of the front fender 35 and detaches the cap 58a to fill the coolant from the upper end of the coolant filler neck 58. In this case, since the coolant filler neck is located at the highest point of the coolant circulating path 202, the coolant can be injected while easily releasing the air.

Alternatively, the relay chamber 31 of this embodiment may be omitted.

Also, the swelled portion 101 formed around the intake opening 102 may be dispensed with.

While the swelled portion 101 substantially extends to a position rearward of the opening, this may be formed only around the portion of the intake opening 102.

While the relay chamber 31 extends to the below of the swelled front portion 101a, this may be formed in one part of the swelled front portion 101a.

While most of the bottom wall and the rear wall of the relay chamber 31 may be constituted by the flexible plate member 33, only the portion of the chamber wall through which the other members penetrate may be constituted by the flexible plate member 33. For example, only the bottom wall portion of the chamber wall may be constituted by the flexible plate member 33.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A straddle-type four wheeled all terrain vehicle comprising:
    a vehicle body;
    a straddle-type seat provided on an upper portion of the vehicle body;
    a bar-type handle having a steering shaft and disposed forward of the seat;
    a vehicle body cover covering a portion of the vehicle body including the steering shaft from above, the vehicle body cover having an opening through which the steering shaft passes; and
    a belt converter of the vehicle, wherein
        the opening, is configured to be an intake port for cooling air for the belt converter
        a relay chamber formed inside of the vehicle body cover so as to communicate with the opening and defined by a chamber wall, and
        a cooling air intake duct configured to lead cooling air to the belt converter, wherein the cooling air intake duct opens in the relay chamber at a tip end thereof.

2. The straddle-type four wheeled all terrain vehicle according to claim 1, wherein a portion of the vehicle body cover around the opening is raised to be formed into a swelled portion,
    the chamber wall of the relay chamber has an upper wall and a lower wall, wherein the upper wall is formed by the swelled portion including the opening and the lower wall is provided with a penetrating hole through which the steering shaft and the cooling air intake duct respectively penetrate.

3. The straddle-type four wheeled all terrain vehicle according to claim 2, wherein a portion of the lower wall that includes at least a portion through which the steering shaft and the cooling air intake duct of the belt converter respectively penetrate, is comprised of a flexible plate member.

4. The straddle-type four wheeled all terrain vehicle according to claim 3, wherein the swelled portion is configured such that front and side portions around the opening are raised and the swelled portion extends rearwardly,
    the relay chamber is structured such that a portion of the swelled portion forms the upper wall,
    a front wall member, a pair of side wall members, a flexible plate member, and a seal structure form the lower wall,
    the front wall member and the pair of side wall members are downwardly protruded at a front end portion and side end portions of the swelled portion that are located forward and side of the opening in an inner face of the vehicle body cover such that the front wall member and the side wall members form an enclosure,
    the flexible plate member substantially defines a bottom and a rear of a space covered by the portion of the swelled portion that is located forward and side of the opening, and
    the seal structure is formed between a front end of the flexible plate member and a lower end of the front wall member.

5. The straddle-type four wheeled all terrain vehicle according to claim 4, wherein the seal structure is formed such that a support member comprises a frame member of the vehicle body, said support member extending along a lower end of the front wall member such that there is clearance between the front wall member and the support member,
    a cushion member is provided on the support member to fill the clearance, and a front end of the flexible plate member is connected to the support member.

6. A straddle-type four wheeled all terrain vehicle comprising:
    a vehicle body;
    a straddle-type seat provided on an upper portion of the vehicle body;
    a bar-type handle having a steering shaft and disposed forward of the seat;
    a vehicle body cover covering a portion of the vehicle body including the steering shaft from above, the steering shaft penetrating through the vehicle body cover; and
    a belt converter, wherein
        an opening in the vehicle body cover through which the steering shaft passes comprises an intake port for cooling air for the belt converter, and
        a relay chamber is formed inside of the vehicle body cover such that the relay chamber communicates with the opening in the vehicle body cover,
        a cooling air intake port of the belt converter is opened in the relay chamber,
        a portion of the vehicle body cover around the opening is raised to be formed into a swelled portion,
        the relay chamber is structured to have a chamber wall including one part comprising a portion of the swelled portion of the vehicle body cover including the opening and another part of vehicle body cover through which the steering shaft and a cooling air intake duct having the cooling air intake port of the belt converter penetrate,
        a portion of said another part of the chamber wall through which at least the steering shaft and the cooling air intake duct of the belt converter penetrate is comprised of a flexible plate member,
        the swelled portion is configured such that front and side portions around the opening are raised and the swelled portion extends rearwardly, the relay chamber is structured such that a portion of the swelled portion defines one part of the chamber wall of the relay chamber, a front wall member, a pair of side wall members, the flexible plate member, and a seal structure define said another part of the chamber wall, the front wall member and the pair of side wall members are downwardly protruded at a front end portion and said end portions of the swelled portion that are located forward and side of the opening in an inner face of the vehicle body cover such that the front wall member and the side wall members form an enclosure, the flexible plate member substantially defines a bottom and a rear of a space covered by the portion of the swelled portion that is located forward and side of the opening, the seal structure is formed between a front end of the flexible plate member and a lower end of the front wall member, and the steering shaft and the cooling air intake duct of the belt converter respectively penetrate through the flexible plate member.

7. The straddle-type four wheeled all terrain vehicle according to claim 6, wherein the seal structure is formed such that a support member comprising a frame member of the vehicle body, said support member extending along a lower end of the front wall member such that there is clearance between the front wall member and the support member, a cushion member is provided on the support member to fill the clearance, and the front end of the flexible plate member is connected to the support member.

* * * * *